Figure 1:
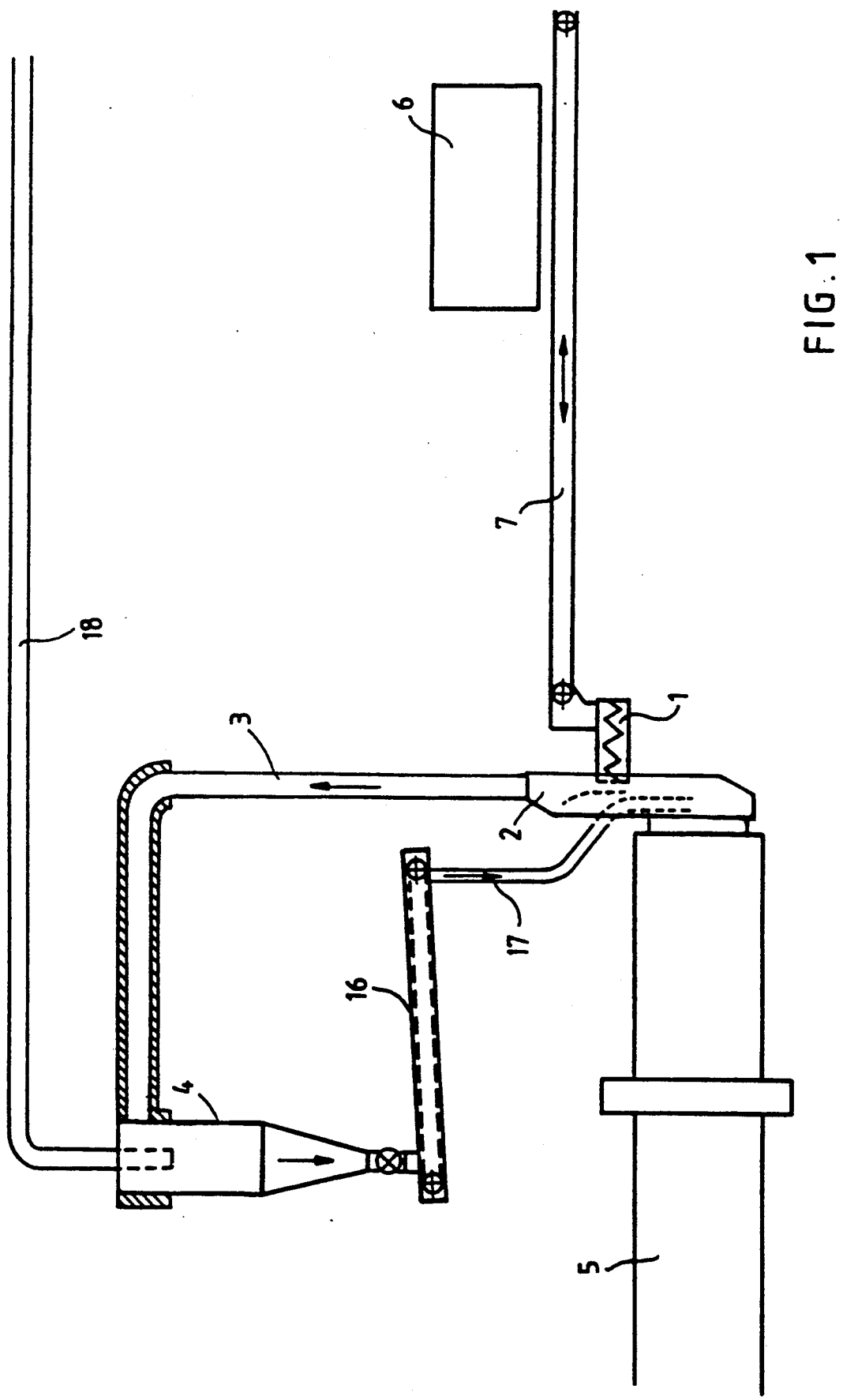

United States Patent [19]
Ahvenainen

[11] Patent Number: 5,213,496
[45] Date of Patent: May 25, 1993

[54] FEEDING SYSTEM FOR A LIME REBURNING KILN

[75] Inventor: Arto J. Ahvenainen, Varkaus, Finland

[73] Assignee: A. Ahlstrom Corporation, Noormarkku, Finland

[21] Appl. No.: 951,326

[22] Filed: Sep. 25, 1992

Related U.S. Application Data

[63] Continuation of Ser. No. 656,070, Feb. 27, 1991, abandoned.

[30] Foreign Application Priority Data

Jul. 3, 1989 [FI] Finland ................................. 893224

[51] Int. Cl.⁵ ............................................. F27B 7/02
[52] U.S. Cl. .................................... 432/103; 432/14; 432/106
[58] Field of Search ........................... 432/14, 103, 106

[56] References Cited

U.S. PATENT DOCUMENTS

| | | | |
|---|---|---|---|
| 2,796,249 | 6/1957 | Plass | 263/32 |
| 3,603,569 | 9/1971 | Abboud et al. | 263/32 |
| 3,975,148 | 8/1976 | Fukuda et al. | 432/106 |
| 4,028,049 | 6/1977 | Naudy | 432/106 |
| 4,118,176 | 10/1978 | Mollenkopf et al. | 432/14 |
| 4,392,822 | 7/1983 | Brachthauser et al. | 432/106 |
| 4,747,879 | 5/1988 | Wolter et al. | 432/14 |
| 4,891,007 | 1/1990 | Herchenbach et al. | 432/106 |

FOREIGN PATENT DOCUMENTS

| | | |
|---|---|---|
| 0369650 | 5/1990 | European Pat. Off. . |
| 3425099 | 2/1986 | Fed. Rep. of Germany . |
| 1238562 | 7/1960 | France . |
| 184846 | 8/1963 | Sweden . |
| 1451057 | 9/1976 | United Kingdom . |

Primary Examiner—Henry C. Yuen
Attorney, Agent, or Firm—Nixon & Vanderhye

[57] ABSTRACT

A method and apparatus for heat treatment of lime mud comprises drying of the lime mud to be introduced into the lime reburning kiln in a pneumatic dryer by means of flue gases discharged from the lime reburning kiln in order to regenerate the lime content of the lime mud. From a drying filter, the lime mud thickened to a dry solids content of over 75%, preferably to 80%, is introduced into a feed chamber through which an adjustment portion of the flue gas is conducted. Depending on the gas amount, 100% or less of the lime mud is entrained with the gas into the dryer, the remaining portion falling into the lower section of the feed chamber, wherefrom it is further transferred into the lime reburning kiln.

9 Claims, 2 Drawing Sheets

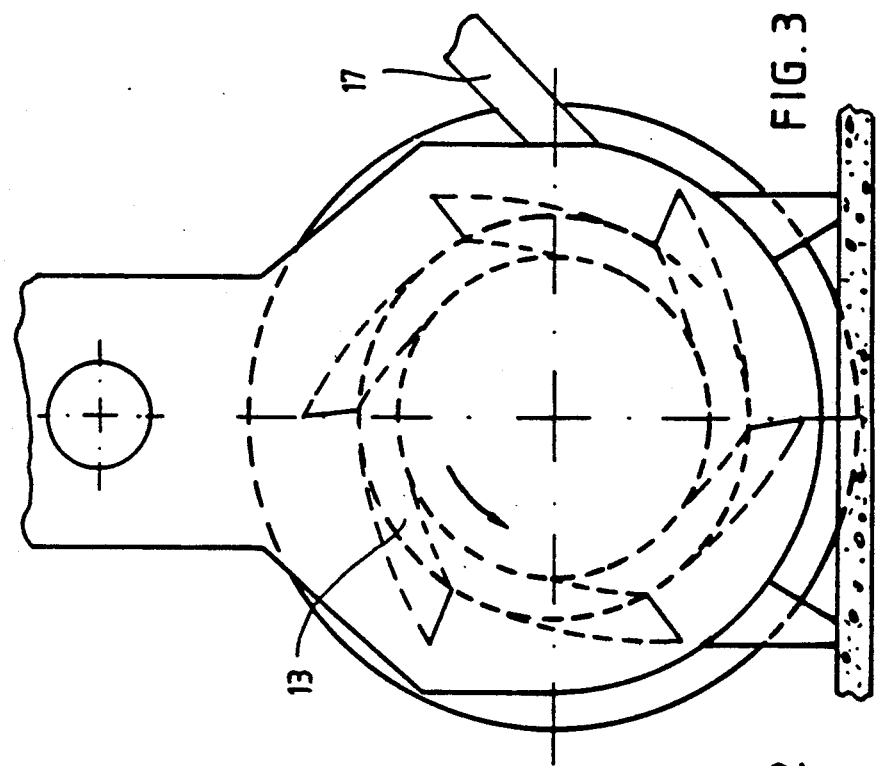
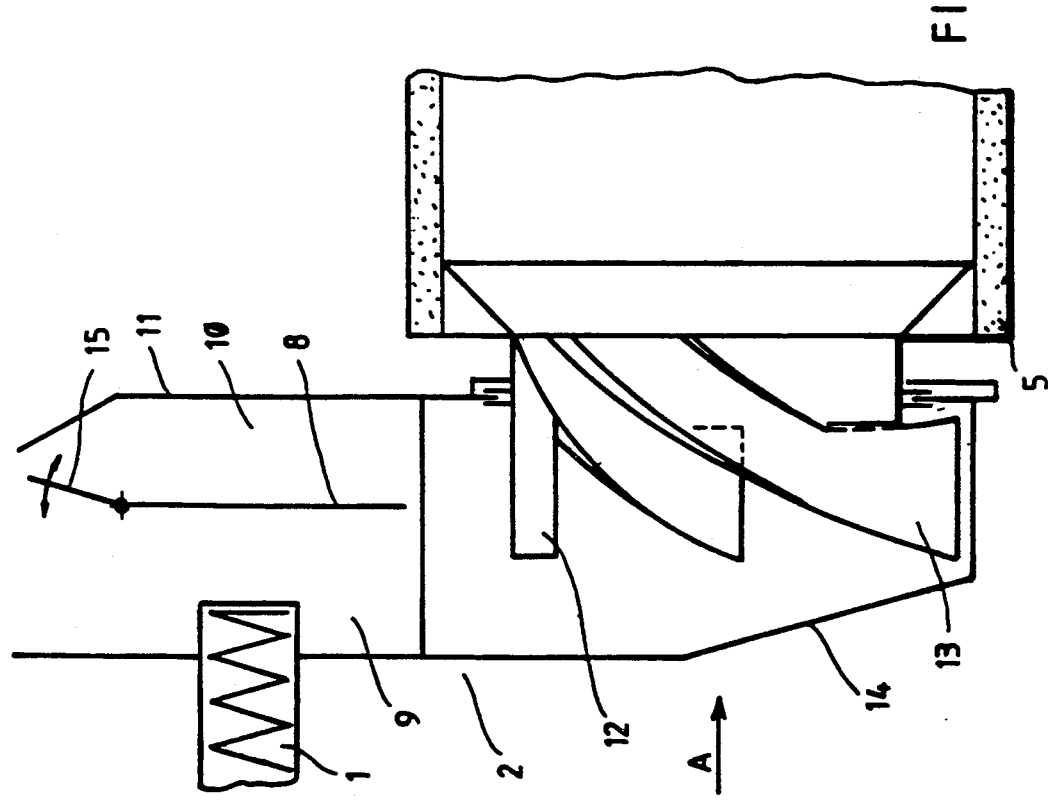

FEEDING SYSTEM FOR A LIME REBURNING KILN

This is a continuation of application Ser. No. 07/656,070, filed Feb. 27, 1991, now abandoned.

The present invention relates to a method and apparatus for feeding lime mud into a rotary kiln in order to regenerate the lime mud, which has been separated in connection with causticizing process and is mainly $CaCO_3$, to form $CaO$ in the rotary kiln.

In previously known apparatuses, lime mud is introduced in a dry solids content of 60 through 70% into the top end of a rotary kiln, wherefrom it slowly moves downwards through drying, heating and reaction zones. To improve the heat transfer, chains are employed in the drying zone where heat is transferred from flue gases to the lime mud mainly through convection. The chains come into contact with lime mud when the kiln rotates. To obtain a good result, the heat treatment of the lime mud in the kiln has to take place slowly. For this purpose, the lime reburning kiln has to be long, consequently requiring a large space.

It has been possible to shorten a lime reburning kiln by drying and preheating the lime mud in pneumatic dryers with flue gas prior to introducing the lime mud into the lime reburning kiln.

Since it is difficult to handle wet lime mud obtained from the filter, it has been mixed with dried lime mud before introducing it into a pneumatic dryer. The equipment needed for the pretreatment of lime mud has been complex and it has required a complicated control and regulating system.

The object of the present invention is to provide a simple method and apparatus for introducing lime mud into a rotary kiln.

Finnish patent application 890376 discloses thickening of lime mud in a lime filter to a dryness of over 75%, whereby it is possible to introduce the lime mud directly into a pneumatic dryer without the necessity of using hammer mills or mixing screws for crushing the lumps. The lime mud is so dry that the dryer will remain open. Another point of feeding lime mud is, however, still needed for the lime reburning kiln. When the "precoat" of the lime mud filter is replaced, it is not desirable to feed the wet lump of lime mud into the pneumatic dryer because there is a risk of the dryer becoming clogged, but the lime mud is introduced directly into the lime reburning kiln by means of a separate feed screw.

In the feeding system according to the invention, the lime mud coming from the filter is fed by means of a feed screw to the same channel from which the lime mud is introduced either into a pneumatic dryer or directly into the lime reburning kiln, or both, depending on the dry solids content and particle size of the lime mud.

It is a main characteristic feature of the method according to the invention that the lime mud is fed into a upwardly moving gas flow which contains an adjustable portion of the flue gases discharged from the lime reburning kiln, that at least part of the lime mud fed into the gas flow is dried in a pneumatic dryer by means of flue gases, the remaining part possibly falling into a feeding means disposed in connection with the inlet or top end of the lime reburning kiln and that the lime mud dried in the dryer is separated from the flue gas and introduced into the lime reburning kiln.

It is a characteristic feature of the apparatus according to the invention that it comprises a feed chamber with the upper section thereof being divided by a partition wall into two adjacent, substantially vertical flow channels and connected to a substantially vertical part of a drying pipe leading to a cyclone, and with the lower section thereof encasing the feeding means disposed at the top end of the lime reburning kiln, a control baffle inserted in the upper section of the partition wall, a feed screw or equivalent for dosing lime mud into one of the feed chambers from adjacent flow channels, and means for introducing dried lime mud which has been separated in the cyclone into the lower section of the feed chamber.

The arrangement according to the invention provides, for example, the following advantages:
 simple and inexpensive construction;
 distribution of lime mud into the dryer/kiln requires no special measures to be taken;
 the end temperature of the dryer may be adjusted by changing the ratio between the gas amounts flowing through adjacent flow channels, consequently affecting the amount of lime mud entering the pneumatic dryer;
 fluctuations of the dry solids content at the lime filter do not cause alterations to the end temperature of the dryer.

The invention is described in more detail below, by way of example, with reference to the accompanying drawings, in which FIG. 1 is a schematic illustration of an apparatus suitable for carrying out the method according to the invention;

FIG. 2 is a vertical, sectional view of a feeding system for a lime reburning kiln in accordance with the invention; and FIG. 3 is an illustration of the feeding system in the direction of travel of arrow A.

FIG. 1 shows the principle of a dryer-kiln system operating in accordance with the method of the invention. The main parts of the apparatus shown in the figure are feed screw 1, feed chamber 2, drying pipe 3, separation cyclone 4 and rotary kiln 5. Lime mud is thickened in a lime filter 6. A belt conveyor 7 disposed underneath the filter receives the lime mud coming from the filter and then drops it into the feed screw 1.

As shown in FIGS. 2 and 3, the feed chamber includes an upper section 11, which is divided by a partition wall 8 into two adjacent, vertical flow channels 9 and 10 and which communicates with the vertical section of the drying pipe 3, and a lower section 14 which encases feed vanes 13 with shovel-formed extensions 12, said feed vanes being attached to the upper section of the rotary kiln.

The drying pipe 3 extends vertically upwardly from the feed pipe and is thereafter bent in the horizontal direction and connected tangentially to the top end of the cyclone 4.

The feed screw 1 opens to one of the adjacent chambers 9 of the feed chamber and doses the lime mud discharged from the filter thereinto. The upper section of the partition wall 8 of the feed chamber is provided with a control baffle 15 for controlling or defining how much of the flue gas discharged from the lime reburning kiln 5 flows through each flow channel 9, 11. Thereby, depending on the position of the control baffle, only part of the flue gas or the entire amount thereof flows through the flow channel 9. The amount may range, for example, from 30 to 100%.

The coarse and wet fraction of the lime mud introduced into the feed chamber falls into the lower section of the feed chamber. When rotating, the shovels 12 disposed at the end of the feed vanes 13 lift it up and the vanes lead it further into the kiln. The lighter fraction is entrained with the flue gas into the cyclone 4 and is dried by the heat of the flue gas. The solid material is separated from the gas in the cyclone and the dried lime mud is discharged from the lower end of the cyclone. A conveyor 16, disposed underneath the cyclone, transfers the dried lime mud into a return pipe 17 leading to the lower section 14 of the feed chamber. The flue gas is removed from the cyclone via pipe 18.

Depending on the amount of flue gas flowing through the flow chamber 9, i.e. on the flow rate of the gas, 100% or less, for example, 50% of the lime mud introduced into said flue gas is entrained with the gas into the drying pipe and dries therein.

The lime mud is introduced into the feed chamber in the dry solids content of over 75%, preferably of 80%, and it dries in the drying pipe by means of flue gases to a dry solids content of about 100%.

The wet "precoat" discharged from the lime filter and introduced into the feed chamber 2 falls into the lower section of the feed chamber, wherefrom it is fed by means of vanes 13 into the lime reburning kiln.

The invention is not limited to the embodiment of the example described above, but its details may vary within the inventive scope defined by the accompanying claims.

We claim:

1. A method of introducing lime mud into a rotary lime reburning kiln using a pneumatic dryer, and having a feed chamber with an upper section and a lower section, the upper section divided by a partition wall into two adjacent flow channels that are substantially vertical, said method comprising the steps of:
    feeding lime mud into the feed chamber from one of the adjacent flow channels so that at least a portion of the lime mud is entrained in an upwardly moving flow of flue gas emanating from the lime reburning kiln and flowing in at least one of the flow channels, so that the entrained lime mud is dried;
    feeding any remaining portion of the lime mud not entrained in the flue gas flow directly into the lime reburning kiln;
    separating the dried lime mud from the flue gas; and
    introducing the dried lime mud into the lower section of the feed chamber so that it is in turn introduced into the lime reburning kiln.

2. A method as claimed in claim 1, further comprising the step of having the lime mud fed into the gas flow in a dry solids content exceeding 75%.

3. A method as claimed in claim 1, further comprising the step of having 50% to 100% of the lime mud fed into the gas flow dried in a pneumatic dryer.

4. A method as claimed in claim 1, further comprising the step of drying in the pneumatic dryer 50% to 100% of the lime mud fed into the gas flow.

5. A method as recited in claim 1 comprising the further step of adjusting the flow volume of the entraining flue gas discharged from the lime reburning kiln so that it is 30 to 100% of the total volume of the flue gas from the kiln.

6. A method as recited in claim 5 wherein a control baffle is disposed at an upper part of the partition wall, and wherein said step of adjusting the flow volume of the entraining flue gases is practiced by moving the baffle.

7. An apparatus comprising:
    a rotary kiln having an inlet, and first feeding means for feeding lime mud into said inlet,
    a feed chamber having an upper section and a lower section, said upper section divided by a partition wall into two adjacent flow channels, said flow channels being substantially vertical;
    said lower section of said feed chamber encasing at least a part of said first feeding means;
    a cyclone;
    said feed chamber connected to a substantially vertical part of a drying pipe, said drying pipe leading to said cyclone;
    a control baffle disposed at an upper part of said partition wall;
    a feed screw for dosing lime mud into said feed chamber from one of said adjacent flow channels; and
    means for introducing dried lime mud separated by said cyclone into said lower section of said feed chamber.

8. The apparatus as claimed in claim 7, wherein said first feeding means includes a plurality of rotatable vanes.

9. The apparatus as claimed in claim 8, wherein said vanes have scoop shaped extensions, and are attached to said inlet of the lime reburning kiln, and when rotating, transfer the lime mud into the lime reburning kiln.

* * * * *